US012793956B2

(12) United States Patent
Akram et al.

(10) Patent No.: US 12,793,956 B2
(45) Date of Patent: Nov. 10, 2026

(54) CONTROLLING BINDER MOBILITY DURING SHRINKAGE PHASE OF DRYING PROCESS IN ELECTRODE MANUFACTURING USING DIELECTROPHORETIC FORCE INDUCED BY AN ELECTRIC FIELD

(71) Applicant: Ford Global Technologies, LLC, Dearborn, MI (US)

(72) Inventors: Maryamossadat Akram, Ann Arbor, MI (US); Wanjiao Liu, Ann Arbor, MI (US); Avinesh Ojha, Southgate, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 475 days.

(21) Appl. No.: 18/407,076

(22) Filed: Jan. 8, 2024

(65) Prior Publication Data

US 2025/0226377 A1 Jul. 10, 2025

(51) Int. Cl.

| | |
|---|---|
| ***H01M 4/04*** | (2006.01) |
| ***H01M 4/02*** | (2006.01) |
| ***H01M 4/62*** | (2006.01) |

(52) U.S. Cl.

CPC ....... *H01M 4/0404* (2013.01); *H01M 4/0471* (2013.01); *H01M 4/623* (2013.01); *H01M 2004/027* (2013.01); *H01M 2004/028* (2013.01)

(58) Field of Classification Search

CPC .. H01M 4/0404; H01M 4/0471; H01M 4/623; H01M 2004/027; H01M 2004/028

See application file for complete search history.

(56) References Cited

U.S. PATENT DOCUMENTS

| | | | | |
|---|---|---|---|---|
| 7,662,265 | B2 | 2/2010 | Chiang et al. | |
| 8,580,430 | B2 | 11/2013 | Chiang et al. | |
| 8,951,669 | B2 | 2/2015 | Lee et al. | |
| 2012/0085649 | A1* | 4/2012 | Sano | B03C 5/005 204/547 |
| 2024/0234733 | A9* | 7/2024 | Park | H01M 4/133 |
| 2025/0226377 | A1* | 7/2025 | Akram | H01M 4/0471 |

FOREIGN PATENT DOCUMENTS

| | | | | |
|---|---|---|---|---|
| CN | 104390901 A | * | 3/2015 | |
| JP | 2014082306 A | * | 5/2014 | H10W 72/072 |

(Continued)

OTHER PUBLICATIONS

Machine Translation of CN-104390901-A (Jun. 18, 2026) (Year: 2026).*

(Continued)

*Primary Examiner* — Matthew J Merkling

(74) *Attorney, Agent, or Firm* — Burris Law, PLLC

(57) ABSTRACT

A method of producing a battery electrode includes applying an electrode material onto a surface of a current collector, the electrode material comprising a binder material having binder particles, initiating a drying process to dry the electrode material, and applying a non-uniform electric field to the electrode material during the drying process. The non-uniform electric field defines a magnitude gradient to generate dielectrophoretic forces on the binder particles, thereby moving the binder particles.

20 Claims, 3 Drawing Sheets

(56) References Cited

FOREIGN PATENT DOCUMENTS

| | | | | |
|---|---|---|---|---|
| WO | WO-2016038747 A1 * | 3/2016 | ............... | G11B 5/84 |
| WO | WO-2024007892 A1 * | 1/2024 | ........... | G01N 27/447 |

OTHER PUBLICATIONS

Machine Translation of JP-2014082306-A (Jun. 18, 2026) (Year: 2026).*
Machine Translation of WO-2016038747-A1 (Jun. 18, 2026) (Year: 2026).*
Machine Translation of WO-2024007892-A1 (Jun. 18, 2026) (Year: 2026).*
Marin-Genescà, et al., Insights into the Structural and Dielectric Behavior of Composites Produced from EPDM Waste Processed through a Devulcanization Method and SBR, ACS Omega, 2023, pp. 12830-12841, vol. 8, ACS Publications.
Rashed, et al., Advances and applications of isomotive dielectrophoresis for cell analysis, Analytical and Bioanalytical Chemistry, Apr. 15, 2020, 21 pgs., Springer-Verlag GmbH, Germany.
Zhang, et al., A Review of Lithium-ion Battery Electrode Drying: Mechanisms and Metrology, 57 pages.
Padurariu, et al., Role of Microstructures in the Dielectric Properties of PVDF-Based Nanocomposites Containing High-Permittivity Fillers for Energy Storage, ACS Applied Materials & Interfaces, 2023, pp. 13535-13544, vol. 15, ACS Publications.

* cited by examiner

CONTROLLING BINDER MOBILITY DURING SHRINKAGE PHASE OF DRYING PROCESS IN ELECTRODE MANUFACTURING USING DIELECTROPHORETIC FORCE INDUCED BY AN ELECTRIC FIELD

FIELD

The present disclosure relates to battery manufacturing and specifically to drying an electrode for use in such battery.

BACKGROUND

The statements in this section merely provide background information related to the present disclosure and may not constitute prior art.

A typical process for battery electrode manufacturing consists of mixing an electrode material, coating the electrode material onto a surface of a current collector, drying the electrode material, and calendaring (compressing) the dried electrode. Each step of the electrode manufacturing process influences the subsequent manufacturing steps and the overall performance of the battery.

Referring to FIG. 1, a typical drying process for manufacturing an electrode battery is shown, which includes multiple drying phases. Generally, during each phase, the mechanism by which a solvent and binder particles move is different and can affect the performance of the battery, as set forth in greater detail below.

Prior to drying, a slurry of an electrode material 100 containing electrode particles 110, particles of a binder material 120, and solvent 130 is applied to a current collector 140, in a pre-drying phase (a). At the beginning of drying, in a shrinkage phase (b), the evaporation rate of the solvent 130 is higher and the drying process is more rapid. At this stage, solvent 130 easily moves to a top surface of the electrode material 100 where evaporation occurs. Small particles, such as the binder particles 120, can be carried with the solvent 130 towards the surface and remain. As a result, without intervention, the concentration of the small binder particles 120 may be increased towards the top surface of the electrode material 100 and decreased towards the current collector 140. Due to solvent 130 removal, the electrode material 100 shrinks and begins to consolidate.

Following the shrinkage phase (b), the thickness of the electrode material 100 remains constant with solvent 130 and binder particles 120 remaining in the network of the porous microstructure, in a capillary phase (c) and a compact phase (d). In the 'capillary phase', the binder particles 120 and the electrode particles 110 are beginning to connect into a network of pores. The solvent 130 and binder particles 120 move through the network of pores between electrode particles 110 under capillary force. The net convection of solvent 130 is still upward through capillary action, taking more binder particles 120 toward the top surface of the electrode material 100. However, the slower effect allows diffusion to migrate some binder particles 120 into a more equalized distribution. In the compact phase (d), the porous microstructure of the electrode material 100 dries and solidifies, and isolated solvent 130 regions are formed. In the localized evaporating regions, binder particles 120 begin to crystallize and lose their mobility. Finally, in the dry electrode (e), the solvent 130 has been evaporated completely and the electrode particles 110 are bound together by the binder particles 130 to form a porous structure.

In each phase, the mobility of the binder particles 120 towards the surface of the electrode material 100 depends on the binder material, size of the particles, thickness of the electrode material, and temperature and airflow of drying and mechanism of drying. Typically, higher drying rate in leads to higher binder concentration towards the top surface by inducing stronger upward transport forces for binders and leaving an insufficient time for binder to diffuse and equilibrate. However, higher drying rate is desirable for high volume production due to its shortened drying time. It is therefore desirable to control and mitigate the binder migration, while still maintaining high drying rate.

These issues related to controlling binder distribution in an electrode material for battery manufacturing are addressed by the present disclosure.

SUMMARY

This section provides a general summary of the disclosure and is not a comprehensive disclosure of its full scope or all of its features.

In one form, the present disclosure provides a method of producing a battery electrode. The method includes applying an electrode material onto a surface of a current collector, the electrode material comprising a binder material having binder particles; initiating a drying process to dry the electrode material; and applying a non-uniform electric field to the electrode material during the drying process. The non-uniform electric field defines a magnitude gradient to generate dielectrophoretic forces on the binder particles, thereby moving the binder particles.

In variations of this method, which may be implemented individually or in any combination: the drying process is performed in a temperature range of 70° C.-120° C.; the electrode material is monolithic; the electric field is an AC electric field with a frequency between 0.01 Hz to 10 KHz; the electric field has a magnitude profile with a range between 0.1 kV $cm^{-1}$ to 200 kV $cm^{-1}$; the electrode is a cathode, the binder material is polyvinyldene fluoride (PVDF), and a solvent is N-Methyl-2-pyrrolidone (NMP); and the electrode is an anode, the binder material particles are water soluble, and a solvent is water.

The present disclosure further provides another method of producing a battery electrode. The method includes applying an electrode material onto a surface of a current collector; applying a non-uniform electric field to the electrode material; and drying the electrode material in a drying process. The electrode material includes a binder material having binder particles. The non-uniform electric field defines a magnitude gradient to generate dielectrophoretic forces on the binder particles such that particles of the binder material are concentrated towards the current collector.

In variations of this method, which may be implemented individually or in any combination: the electrode is a cathode, the binder material is polyvinyldene fluoride (PVDF), and a solvent is N-Methyl-2-pyrrolidone (NMP); the electrode is an anode, the binder material particles are water soluble, and a solvent is water; the drying process is performed in a temperature range of 70° C.-120° C.; the electric field has a magnitude profile with a range between 0.1 kV $cm^{-1}$ to 200 kV $cm^{-1}$; and the electrode material is monolithic.

In another form, the present disclosure provides a method of producing a battery electrode. The method includes applying an electrode material onto a surface, applying a non-uniform electric field to the electrode material, and drying the electrode material in a drying process. The electrode material includes a binder material. The non-uniform electric field has a higher magnitude during a first time period and a lower magnitude during a second time period. The non-uniform electric field generates dielectrophoretic forces on the binder particles, thereby moving the binder particles.

In variations of this method, which may be implemented individually or in any combination: the higher magnitude has a range between 0.1 kV $cm^{-1}$ to 200 kV $cm^{-1}$; the lower magnitude has a range between 0.1 kV $cm^{-1}$ to 200 kV $cm^{-1}$; the first time period occurs before the drying process begins; the electrode is a cathode, the binder material is polyvinyldene fluoride (PVDF), and a solvent is N-Methyl-2-pyrrolidone (NMP); the drying process is performed in a temperature range of 70° C.-120° C.; and the electrode material is monolithic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
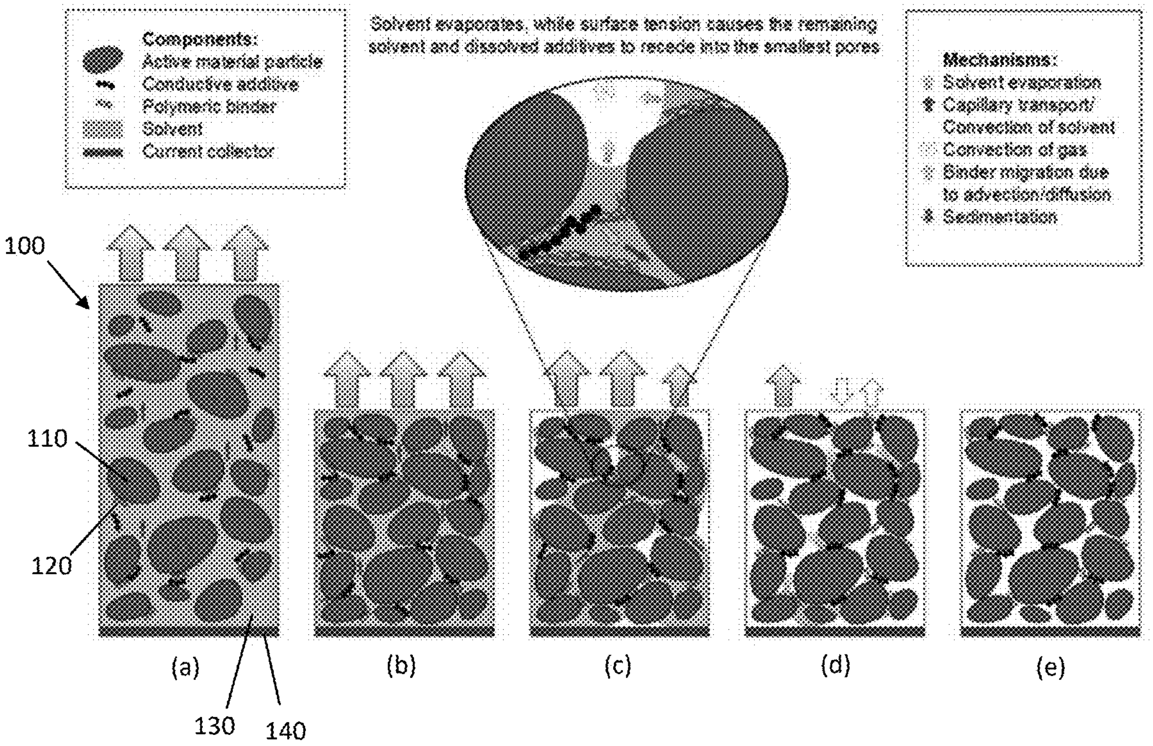
FIG. 1 PRIOR ART
FIG. 1 is a schematic diagram illustrating stages of a battery electrode drying process according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to counter the uneven mobility of binder particles as set forth above, the inventors have discovered that applying a non-uniform electric field to the electrode material can control the movement and thus final distribution of binder particles within the electrode material. The non-uniform electric field has a voltage magnitude gradient to generate dielectrophoretic forces, which act on the binder particles 120, which is described in greater detail below.

Figure 2:
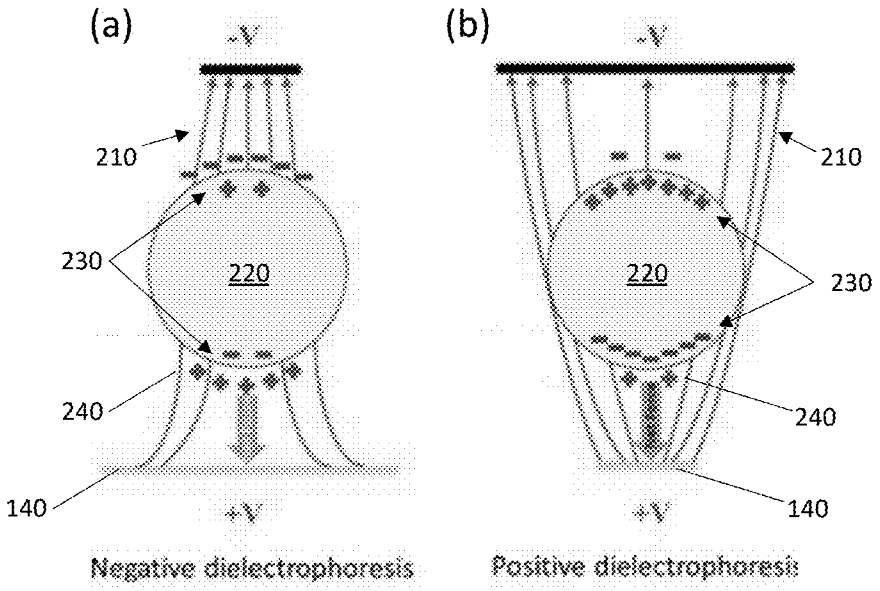
FIG. 2 is a schematic diagram illustrating a particle in a non-uniform electric field according to the teachings of the present disclosure.

Referring now to FIG. 2, the general use of dielectrophoretic forces is illustrated with a non-uniform electric field 210 applied to a particle 220 such as a particle of binder material 120. The non-uniform electric field 210 polarizes the particle 220, inducing a force on the poles 230 along the field lines 240. The orientation of the resulting dipole (separation of opposite electrical charges) is dependent on the relative polarizability of the particle 220 and a surrounding medium such as solvent. Since the electric field 210 is non-uniform, the pole 230 experiencing the greatest electric field will dominate over the other, and the particle 220 will move. The poles 230 and corresponding magnitude gradient on the particle 220 are oriented to move the particle 220 toward the current collector. In the negative dielectrophoresis arrangement shown in (a), the non-uniform electric field 210 has a greater magnitude in the direction of the current collector 140 and the particle is attracted towards the current collector 140. Alternatively, in the positive dielectrophoresis arrangement shown in (b) the magnitude gradient is configured to repulse the particle 220 away from the top surface of the electrode material toward the current collector 140.

Figure 3:
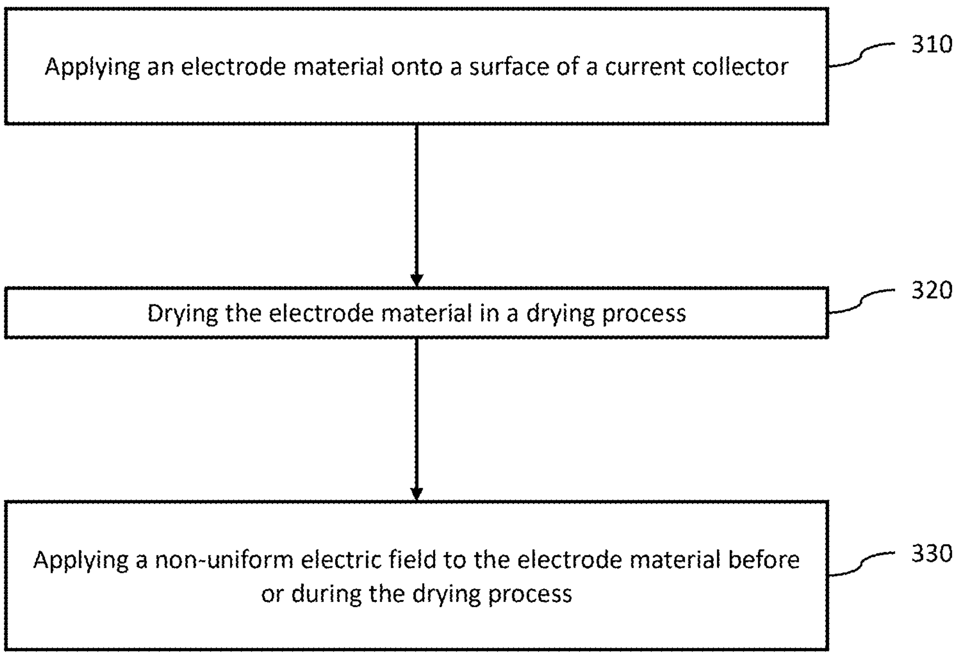
FIG. 3 is a flow diagram illustrating a novel method of producing a producing a battery electrode according to the teachings of the present disclosure.

Referring to FIG. 3, a novel method of producing a battery electrode according to the teachings of the present disclosure using the dielectrophoretic forces described above is shown. To begin, an electrode material 100 is applied to a surface of a current collector 140. The electrode material 100 is in the form of a homogenous slurry and applied as a single monolithic layer. The slurry components generally include electrode particles 110, a binder material 120, and a solvent 130, but are not necessarily limited thereto. In the single monolithic layer, the binder material is evenly distributed when first applied. No additional layers of varying composition are necessary.

The electrode particles 110 include active particles and may optionally include electrically conductive additive particles. The active particles form the bulk of the electrode and interact with ions in the battery fluid, such as lithium ions in a lithium battery. In one form of the present disclosure, the active particles are a carbon material such as graphite. In other forms, the active particles are lithium titanate (Li4Ti5O12), lithium nickel manganese cobalt oxide, and graphene, among others. The conductive additive particles aid the conductivity of the electrode and the movement of ions to the active particles. In one form, the conductive additive particles include carbon black. It should be understood that other materials for the electrode particles 110, which have the described properties and functions set forth herein, may be implemented while remaining within the scope of the present disclosure.

The binder material 120 has binder particles and may be any of a variety of polymeric materials that function to hold the electrode particles 110 together. For example, the binder material 120 may be fluoro-acrylic polymer, polytetrafluoroethylene (PTFE), polyvinylidene fluoride, polyacrylates, aliphatic polymers, aromatic polymers, oligo- and polysaccharides, chitosan, alginate, pectin, amylose, starch, gums, lignin, and proteins, among others. It should be understood that other materials which serve to bind the electrode particles 110 may be utilized while remaining within the scope of the present disclosure.

The solvent 130 generally functions to suspend or disperse the electrode particles 110 and the binder particles 120 and may be any of a variety of materials, including by way of example, H2O (Water), N-Methyl-2-pyrrolidone (NMP), Dimethylformamide (DMF), Dimethylacetamide (DMAC), and Dimethyl sulfoxide (DMSO), among others. It should be understood that other solvents may be implemented while remaining within the scope of the present disclosure.

After application to the current collector, the electrode material 100 is dried to remove the solvent 130, leaving the binder material 120 and the electrode particles 110, which form a porous nanostructure. In one form, the electrode material 100 is dried at a temperature of 70° C.-120° C.

During the drying process, the non-uniform electric field is applied to the electrode material 100. In one form, the electric field is an AC (alternating current) field with a frequency between 0.01 Hz and 10 KHz. In one form, the electric field has a magnitude of 0.1 kV $cm^{-1}$ to 200 kV $cm^{-1}$.

In various forms, the non-uniform electric field 210 may be applied during the pre-drying phase (a), during the shrinkage phase (b) of the drying process, during the capillary phase (c), during the compact phase (d) of the drying process, or any combination thereof. In one form, the dielectrophoretic forces 210 cause the binder particles 220 to move into a pre-determined distribution. For example, the predetermined distribution may have binder particles 120 concentrated towards the surface of the current collector 140. The particles 220 are moved to the predetermined distribution if the non-uniform field 210 is applied in pre-drying phase (a) before the drying process has begun or if the dielectric force 210 is stronger than the forces provided by the movement of the solvent 130. In another form, the dielectrophoretic forces 210 balance against the movement of the solvent 130 during the drying process holding the binder particles 120 in place. In this form, the approximate distribution of the binder particles 120 is maintained, either in the original even distribution of the pre-drying phase (a) or in the predetermined distribution.

One approach to moving the binder particles 120 to a predetermined distribution is by applying different voltage magnitude gradients at different phases of the drying process. In one form, the non-uniform electric field 210 has a higher magnitude during a first time period and a lower magnitude during a second time period. For example, the higher magnitude force may be applied prior to drying (a) to concentrate binder particles 120 toward the surface of the current collector 140 and the lower magnitude may be applied during the shrinkage phase (b). Alternatively, the higher magnitude force may be applied during the shrinkage phase (b) and the lower magnitude may be applied during the compact phase (d).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of producing a battery electrode, the method comprising:

applying an electrode material onto a surface of a current collector, the electrode material comprising a binder material having binder particles;

initiating a drying process to dry the electrode material; and applying a non-uniform electric field to the electrode material during the drying process, wherein the non-uniform electric field defines a magnitude gradient to generate dielectrophoretic forces on the binder particles, thereby moving the binder particles.

2. The method of claim 1, wherein the drying process is performed in a temperature range of 70° C.-120° C.

3. The method of claim 1, wherein the electrode material is monolithic.

4. The method of claim 1, wherein the electric field is an AC electric field with a frequency between 0.01 Hz to 10 KHz.

5. The method of claim 1, wherein the electric field has a magnitude profile with a range between 0.1 kV $cm^{-1}$ to 200 kV $cm^{-1}$.

6. The method of claim 1, wherein the electrode is a cathode, the binder material is polyvinyldene fluoride (PVDF), and a solvent is N-Methyl-2-pyrrolidone (NMP).

7. The method of claim 1, wherein the electrode is an anode, the binder particles are water soluble, and a solvent is water.

8. A method of producing a battery electrode, the method comprising:

applying an electrode material onto a surface of a current collector, the electrode material comprising a binder material having binder particles;

applying a non-uniform electric field to the electrode material, wherein the non-uniform electric field defines a magnitude gradient to generate dielectrophoretic forces on the binder particles such that particles of the binder material are concentrated towards the current collector; and drying the electrode material in a drying process.

9. The method of claim 8, wherein the electrode is a cathode, the binder material is polyvinyldene fluoride (PVDF), and a solvent is N-Methyl-2-pyrrolidone (NMP).

10. The method of claim 8, wherein the electrode is an anode, the binder particles are water soluble, and a solvent is water.

11. The method of claim 8, wherein the drying process is performed in a temperature range of 70° C.-120° C.

12. The method of claim 8, wherein the electric field has a magnitude profile with a range between 0.1 kV $cm^{-1}$ to 200 kV $cm^{-1}$.

13. The method of claim 8, wherein the electrode material is monolithic.

14. A method of producing a battery electrode, the method comprising:

applying an electrode material onto a surface, the electrode material comprising a binder material having binder particles;

applying a non-uniform electric field to the electrode material, the non-uniform electric field having a higher magnitude during a first time period and a lower magnitude during a second time period, wherein the non-uniform electric field generates dielectrophoretic forces on the binder particles, thereby moving the binder particles; and drying the electrode material in a drying process.

15. The method of claim 14, wherein the higher magnitude has a range between 0.1 kV $cm^{-1}$ to 200 kV $cm^{-1}$.

16. The method of claim 14, wherein the lower magnitude has a range between 0.1 kV $cm^{-1}$ to 200 kV $cm^{-1}$.

17. The method of claim 14, wherein the first time period occurs before the drying process begins.

18. The method of claim 14, wherein the electrode is a cathode, the binder material is polyvinyldene fluoride (PVDF), and a solvent is N-Methyl-2-pyrrolidone (NMP).

19. The method of claim 14, wherein the drying process is performed in a temperature range of 70° C.-120° C.

20. The method of claim 14, wherein the electrode material is monolithic.

* * * * *